United States Patent [19]

Luscher, Jr.

[11] Patent Number: 5,600,551
[45] Date of Patent: Feb. 4, 1997

[54] ISOLATED POWER/VOLTAGE MULTIPLIER APPARATUS AND METHOD

[75] Inventor: James J. Luscher, Jr., Madison, Wis.

[73] Assignee: Schenck-Accurate, Inc., Whitewater, Wis.

[21] Appl. No.: 510,414

[22] Filed: Aug. 2, 1995

[51] Int. Cl.⁶ .................................................... H02M 3/18
[52] U.S. Cl. ............................................. 363/59; 307/110
[58] Field of Search ................................ 363/59, 60, 61; 307/109, 110

[56] References Cited

U.S. PATENT DOCUMENTS

| | | | |
|---|---|---|---|
| 3,821,627 | 6/1974 | Milovancevic | 321/2 |
| 4,050,005 | 9/1977 | Maginness | 363/59 |
| 4,807,104 | 2/1989 | Floyd et al. | 363/59 |
| 5,051,881 | 9/1991 | Herold | 363/60 |
| 5,111,375 | 5/1992 | Marshall | 363/60 |
| 5,132,895 | 7/1992 | Kase | 363/60 |
| 5,245,524 | 9/1993 | Nakagawa et al. | 363/62 |
| 5,280,420 | 1/1994 | Rapp | 363/60 |
| 5,339,236 | 8/1994 | Tamagawa | 363/59 |
| 5,438,504 | 8/1995 | Menegoli | 363/60 |
| 5,481,447 | 1/1996 | Caris et al. | 363/60 |
| 5,491,623 | 2/1996 | Jansen | 363/60 |
| 5,502,629 | 3/1996 | Ito et al. | 363/60 |

OTHER PUBLICATIONS

Maxwell Strange, "IC Timer Makes Transformerless Power Converter," *EDN*, Dec. 20, 1973, p. 81.

John Markus, *Modern Electronic Circuits Reference Manual*, "Converter Circuits—DC to DC", Chapter 17, 1980, pp. 188–197.

*Computer Design*, "Small Converters Eliminate Inductors," May 1995, p. 80.

Linear Technology, LTC1262, "12V, 30mA Flash Memory Programming Supply," pp. 1 and 4.

Power Trends, "When It's Your Job to Make the Impossible, Possible," EDN, Apr. 27, 1995, p. 125.

*Thomas Register*, DC–DC Converters, No. 4025, EEM 1995.

*Primary Examiner*—Matthew V. Nguyen
*Assistant Examiner*—Adolf Berhane
*Attorney, Agent, or Firm*—Foley & Lardner

[57] ABSTRACT

A voltage multiplier and capacitive isolation power supply using capacitors, diodes and first and second clock signals that are out-of-phase with respect to each other. When the first clock signal is high and the second clock signal is low, a capacitor in a first stage transfers charge to a capacitor in a second stage. When the first clock signal is low and the second clock signal is high, the capacitor in the second stage transfers charge to an output capacitor, and the capacitor in the first stage is recharged via a feedback diode between a capacitor connected to a ground potential and the capacitor in the first stage. Additionally, the capacitors in each of the stages provide an isolation function for the power supply.

10 Claims, 10 Drawing Sheets

ISOLATED POWER/VOLTAGE MULTIPLIER APPARATUS AND METHOD

BACKGROUND OF THE INVENTION

1. Field of the Invention

The invention relates to an apparatus for providing isolation for a power supply. The invention also relates to providing a voltage multiplier function for the power supply. More specifically, the invention relates to the use of two out-of-phase signals in an arrangement of capacitors and diodes in order to provide both capacitive isolation and voltage multiplication for a DC-DC converter power supply.

2. Description of the Related Art

It is often necessary to have a voltage that is several orders of magnitude greater than a supply voltage. For example, a voltage doubler is commonly required to provide the necessary amount of voltage to a load.

Ideally, a power supply that supplies power to a load should be isolated from the drivers that are connected to the power supply. That is, isolation is desired in order to protect analog I/O lines from the voltage levels of other systems, which may cause failures when the I/O lines are connected to other systems which operate at elevated voltages.

Transformers are typically used to provide isolation for a power supply or a converter. However, transformers are typically large in size (due to the size of the magnetic elements within them) and are costly.

Charge pump devices can be used to obtain an output voltage that is greater than an input voltage; i.e., to provide a voltage amplification function. Conventional charge pump devices include a series of stages, with each stage including a capacitor and a switch. Each stage of the charge pump device boosts the magnitude of the voltage input to the stage by a voltage equal to the voltage swing of a two-phase signal applied to the capacitor in the stage.

At each stage, the capacitor will store an increased maximum voltage difference across its plates. For example, using a +12 volt supply, the capacitor in the first stage will store a charge proportional to 12 volts across its plates, the capacitor in the second stage will store a charge proportional to 24 volts across its plates, etc.

The magnitude of the voltage across the capacitor will determine its structure and size. The greater the amount of voltage that a capacitor can withstand, the greater the size of the capacitor, which leads to a larger and more expensive capacitor, and hence a larger and more expensive power supply.

SUMMARY OF THE INVENTION

Accordingly, it is an object of the invention to provide both capacitive isolation and voltage multiplication using diodes and capacitors in separate stages.

The invention provides a voltage doubler and isolation circuit. The circuit includes a first and second input port, first through fourth capacitors, and first through third diodes. The first input port receives a first clock signal, with the first clock signal being in one of a high voltage and a low voltage state. The second input port receives a second clock signal opposite in phase with respect to the first clock signal, with the second clock signal being in one of the high voltage state and the low voltage state. The first capacitor has a first plate coupled to the first input port and a second plate. The second capacitor has a first plate coupled to the second input port and a second plate. The first diode has an anode coupled to the second plate of the first capacitor and a cathode coupled to the second plate of the second capacitor. The third capacitor has a first plate coupled to a low reference potential and a second plate. The second diode has an anode coupled to the second plate of the second capacitor and a cathode. The fourth capacitor has a first plate coupled to the cathode of the second diode and a second plate coupled to the second plate of the third capacitor. The fourth capacitor operates as an output capacitor in which an output voltage corresponding to twice the high voltage state is stored therein. The third diode has an anode coupled to the second plate of the third capacitor and a cathode coupled to the second plate of the first capacitor. With the above-described circuit, when the first clock signal is in the high voltage state, a charge on the first capacitor is transferred through the first diode to the second capacitor, and when the first clock signal is in the low voltage state, the second capacitor is further charged by the second clock signal to a doubled charged value and transfers the doubled charge to the fourth capacitor. Also, with the above-described circuit, the first capacitor is recharged when the first clock signal is in the low state by pulling charge from the third capacitor through the third diode.

According to the invention, there is also provided a voltage multiplier circuit for providing charge to a load and configured to receive a first and a second clock signal, with the first and second clock signals being out of phase with respect to each other, and each having one of a first and a second voltage value. The voltage multiplier circuit includes a first stage coupled to receive the first clock signal and to store a first charge corresponding to a voltage difference between the first and second voltage values when the first clock signal is at the first voltage value, and to output the first charge when the first clock signal is at the second voltage value. The voltage multiplier circuit also includes a second stage coupled to receive the second clock signal and coupled to the first stage for receiving the first charge. The second stage is configured to store a second charge corresponding to two times a voltage difference between the first and second voltage values when the first clock signal is at the first voltage value, and to output the second charge when the second clock signal is at the second voltage value. The voltage multiplier circuit also includes a reference capacitor coupled to a reference potential. The voltage multiplier circuit still further includes an output capacitor coupled to receive the second charge from the second stage. The voltage multiplier circuit also includes a feedback diode coupled to the output capacitor, the reference capacitor and the first stage, wherein when the first clock signal is at the second voltage value, a feedback charge proportional to amount of charge drawn off the output capacitor by the load is sent to recharge the first stage via the feedback diode.

The first and second stages may be repeated to increase the voltage output by additional multiples of the clock voltage.

BRIEF DESCRIPTION OF THE DRAWINGS

In describing an apparatus according to the invention, reference is made to the following description and accompanying drawings, in which.

DETAILED DESCRIPTION OF THE PREFERRED EMBODIMENTS

Figure 1:
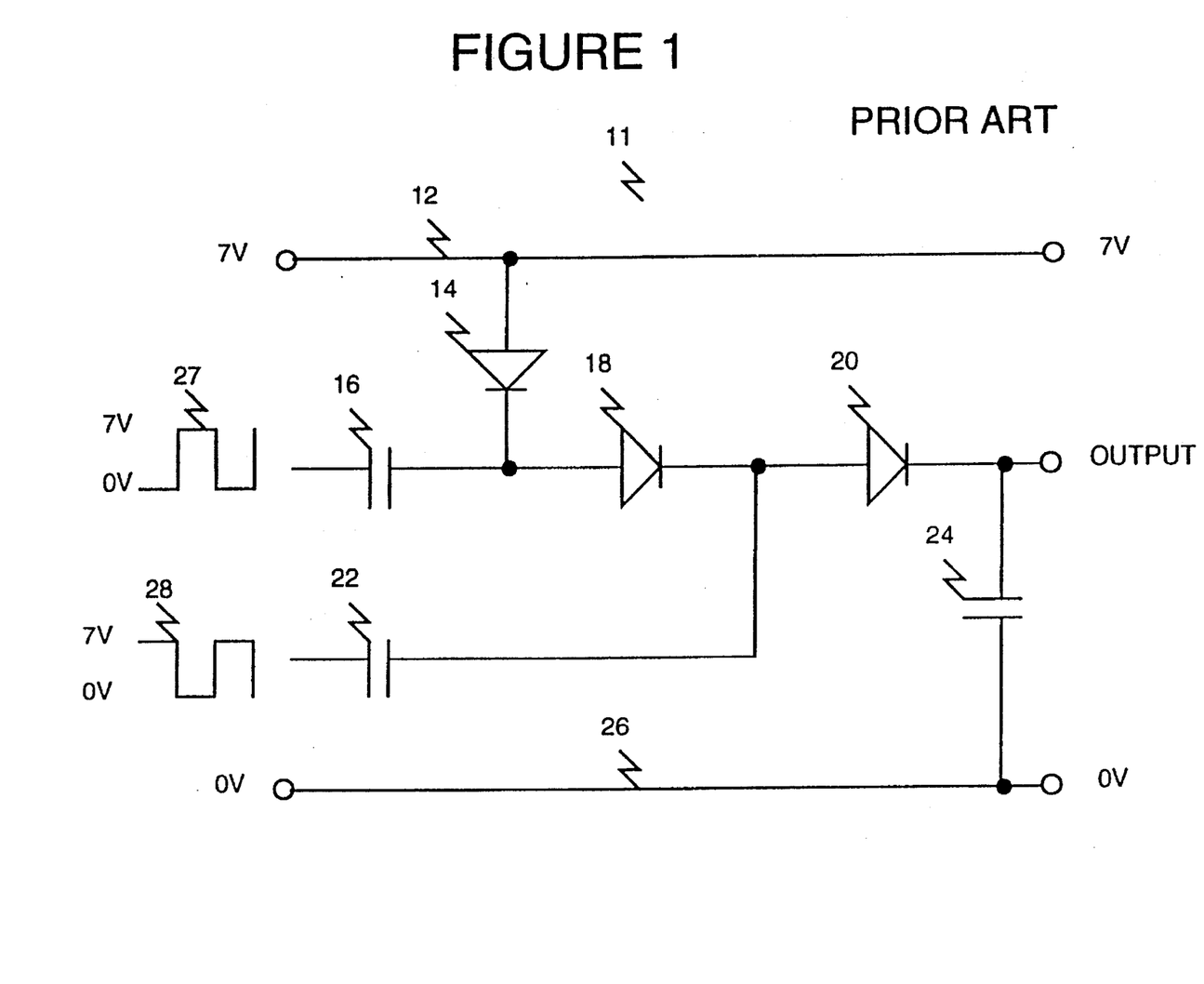
FIG. 1 is a diagram of a conventional charge pump device used for voltage multiplication.

FIG. 1 illustrates a schematic representation of a conventional charge pump circuit 11 used as a voltage amplifier. In FIG. 1, the high voltage supply rail 12 (shown as seven volts) is coupled to an anode of diode 14. The cathode of diode 14 is coupled to the first plate of capacitor 16 and to the anode of diode 18. The second plate of capacitor 16 is coupled to a first clock signal 27. The cathode of diode 18 is coupled to the anode of diode 20 and to the first plate of capacitor 22. The second plate of capacitor 22 is coupled to a second clock signal 28, which is 180 degrees out of phase with respect to the first clock signal 27. The cathode of diode 20 is coupled to the first plate of a capacitor 24. The second plate of capacitor 24 is coupled to the low voltage supply rail 26 (shown as zero volts).

For ease of explanation, the operation of the charge pump circuit 11 will be described without taking into account the voltage drops across each of the diodes 14, 18 and 20 in FIG. 1. Typically, however, the diodes will each account for a voltage drop of about 0.7 volts for a junction diode and a voltage drop which is much higher for a metal oxide semiconductor (MOS) diode.

Initially, it is assumed that the voltage at the cathodes of diodes 14, 18 and 20 is seven volts, due to the high voltage supply rail 12. The first clock signal 27 coupled to capacitor 16 is initially at zero volts and the second clock signal 28 coupled to capacitor 22 is initially at seven volts. As the first clock signal 27 coupled to capacitor 16 transitions from zero to seven volts, the voltage at the cathode of diodes 18 and 20 are boosted to fourteen volts.

When the first clock signal 27 coupled to capacitor 16 transitions from zero volts to seven volts, the second clock signal 28 coupled to capacitor 22 transitions from seven volts to zero volts. When the second clock signal 28 subsequently transitions from zero volts to seven volts, the voltage at the cathode of diode 18, and consequently the voltage at the cathode of diode 20, is increased to twenty-one volts. Thus, the charge pump circuit 11 of FIG. 1 provides a voltage tripler function with respect to the voltage rails 12 and 26.

With the structure as shown in FIG. 1, however, isolation between the power supply rails 12 and 26 and the output power rails (OUTPUT, 0 V) is not provided, which can result in damage to the power supply 11 under certain conditions. Further, other types of conventional power supplies, such as those described in Floyd, et al., Voltage Multiplying and Inverting Charge Pump, U.S. Pat. No. 4,807,104, and Tamagawa, Charge Pump Circuit For Intermediate Voltage Between Power Supply Voltage and Its Doubled Voltage, U.S. Pat. No. 5,339,236, use switches which need to be precisely controlled by clock signals in order to enable positioning of these switches at precise moments in time.

Figure 2:
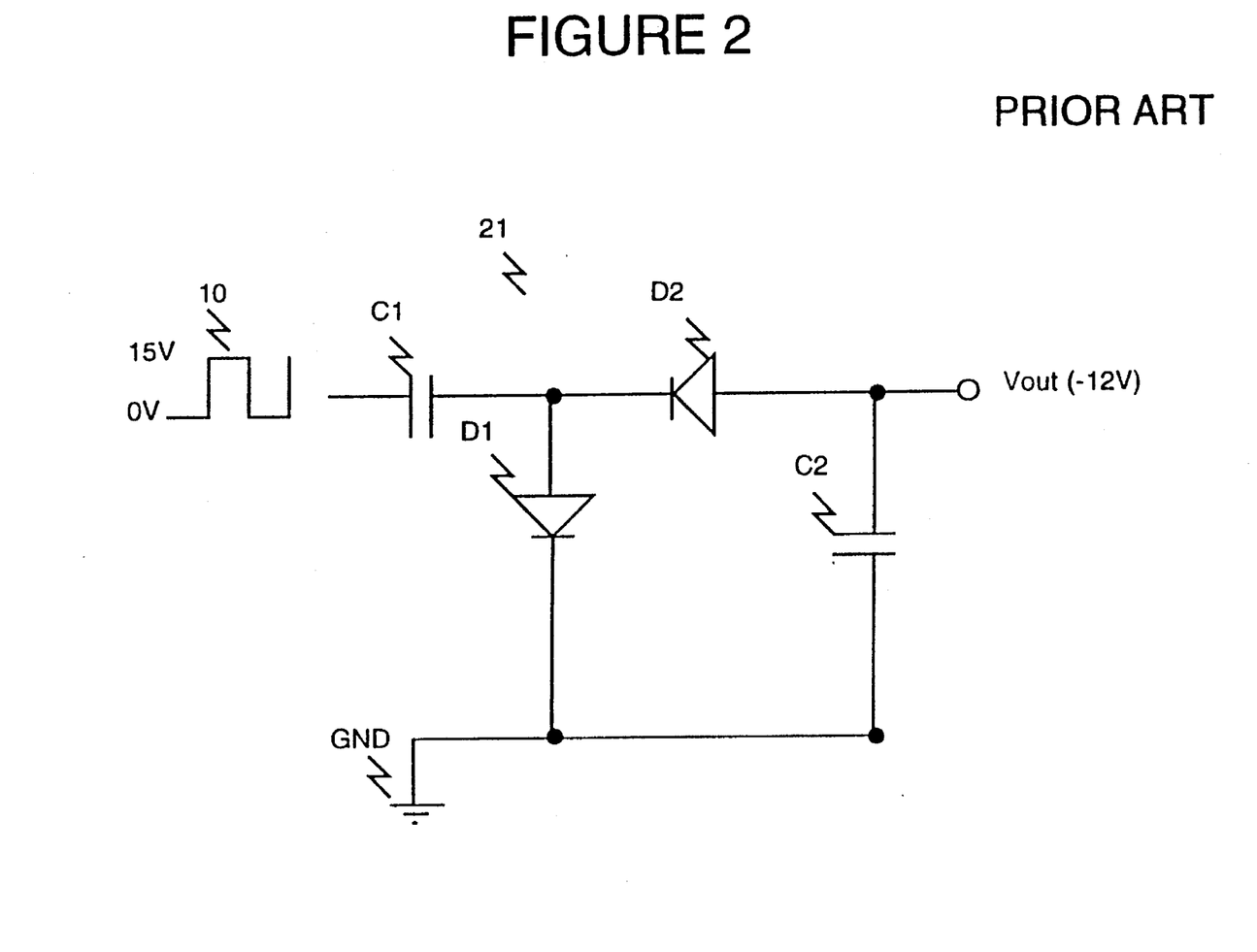
FIG. 2 is a diagram of a conventional voltage multiplying circuit using an input pulse train.

Another type of conventional DC-DC voltage converter is shown in FIG. 2. In this configuration, a 50% duty cycle, square-wave pulse train 10 oscillates between 0 volts and 15 volts. The pulse train 10 is input to a left plate of a capacitor C1 (throughout this discussion, "left" plate, "right" plate, "top" plate and "bottom" plate will be used for ease of explanation when referring to capacitor plates in the drawings). The right plate of capacitor C1 is connected to an anode of diode D1, and is also connected to a cathode of diode D2. The cathode of diode D1 is connected to a ground GND, and the anode of diode D2 is connected to the top plate of an output capacitor C2. The bottom plate of output capacitor C2 is connected to ground GND. Using the circuit 21 as shown in FIG. 2, a −12 volt DC output voltage is obtained across the capacitor C2.

The operation of the circuit 21 is described in detail hereinbelow. A square wave pulse train 10 that alternates between 15 volts and 0 volts is input to the left plate of capacitor C1. When the pulse train 10 is at 15 volts, capacitor C1 is charged up accordingly, which creates a voltage of 15 volts at the right plate of capacitor C1. Since the anode of diode D1 is at 15 volts and the cathode of diode D1 is at a ground potential, diode D1 becomes forward biased (i.e., conductive), and the capacitor C1 is discharged to ground via diode D1. That charge is also collected on the bottom plate of capacitor C2.

When the pulse train 10 that is applied to the left plate of capacitor C1 drops from 15 volts to 0 volts, the right plate of capacitor C1 drops 15 volts as well (since a capacitor always maintains a constant voltage across its plates), and the right plate of capacitor C1 is now at −15 volts. The capacitor C1 now wants to pull current in from somewhere to recharge itself. This current is pulled in from the output capacitor C2 via diode D2. Diode D2 is conductive since the anode of diode D2 is at a higher voltage (−12 volts) than the cathode of diode D2 (−15 volts). Therefore, with the circuit 21, the capacitor C1 charges the capacitor C2 via diode D1 when the pulse train 10 is at 15 volts, and the capacitor C1 pulls in charge from capacitor C2 via diode D2 when the pulse train 10 is at 0 volts. Normally, a load (not shown) is connected across capacitor C2, which draws current from capacitor C2 and drops the voltage across capacitor C2 accordingly. The more current that is drawn by the load, then the more current is drawn from capacitor C2 by capacitor C1 to thereby recharge capacitor C1.

Based on the conventional circuit 21, an improvement can be made such that capacitors can be used both to provide voltage conversion for a power supply, as well as to provide an isolation for the power supply with respect to external lines and drivers. Since capacitors are typically small, inexpensive devices (with respect to transformers), there is an economic benefit as well.

Figure 3:
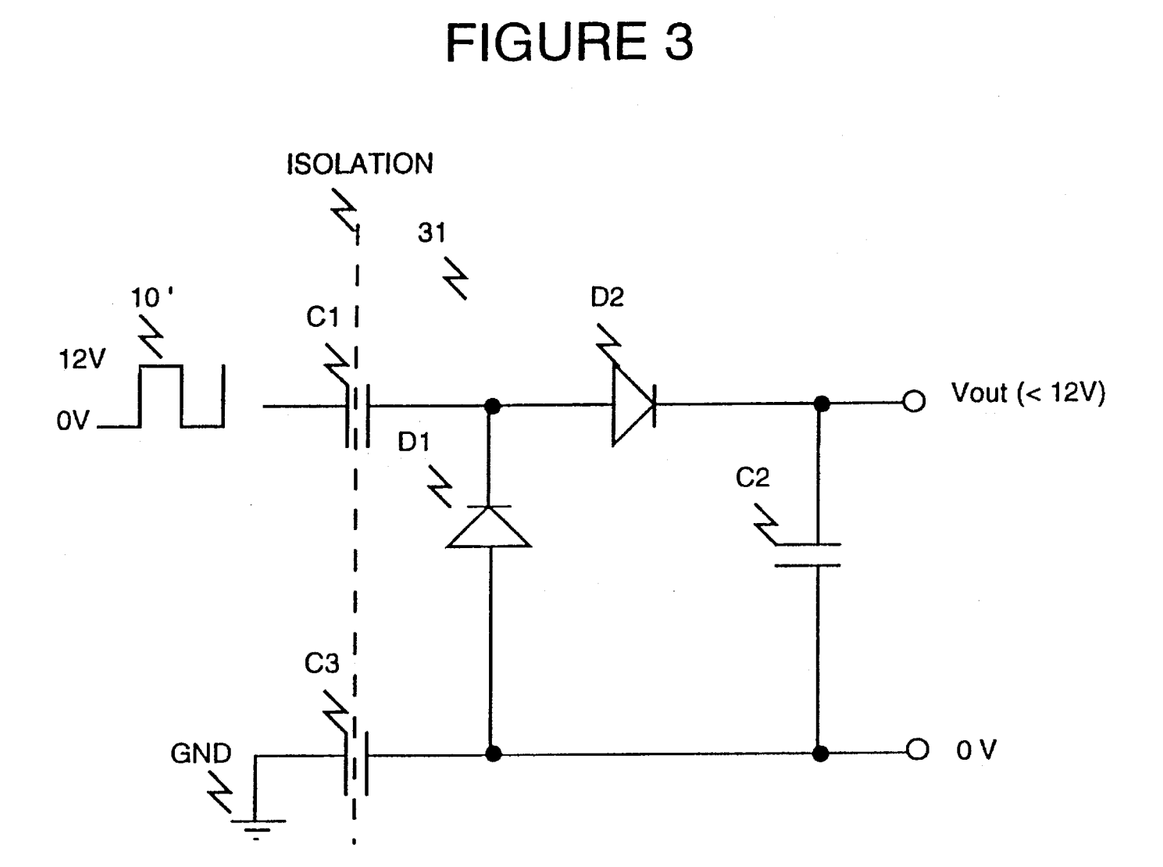
FIG. 3 is a diagram of a modification of FIG. 2, which provides a degree of capacitive isolation.

FIG. 3 shows an improvement of the conventional voltage converter circuit 21 of FIG. 2. In the circuit 31 of FIG. 3, a capacitor C3 is added to the circuit 21 of FIG. 2, as well as the diodes D1 and D2 being switched in direction to generate a positive $V_{out}$. The circuit 31 of FIG. 3 provides isolation as well as voltage conversion. The isolation can be seen figuratively as a dotted line between the respective plates of each of the capacitors C1 and C3. That is, the voltage conversion (right) side of FIG. 3 could be at a relatively high voltage (e.g., 500 volt reference connected to zero volt output), while the input driver (left) side could be at a much lower voltage (e.g., within ±10 volts of ground) at the same time. The isolation provided by the capacitors C1 and C3 protects the voltage conversion circuit 31 of FIG. 3 from any sudden fluctuations in the input driver side (such as fluctuations in the driver providing the signal 10), and vice versa.

However, the circuit 31 as shown in FIG. 3 has some problems associated with it in that it is impossible to obtain +12 volt-DC at the output from a +12 volt-DC powered driver signal. For example, if an input square wave pulse train 10' that switches between 12 volts and 0 volts is provided to the left plate of capacitor C1, something less than +12 volt DC will appear across the output capacitor C2.

Figure 4:
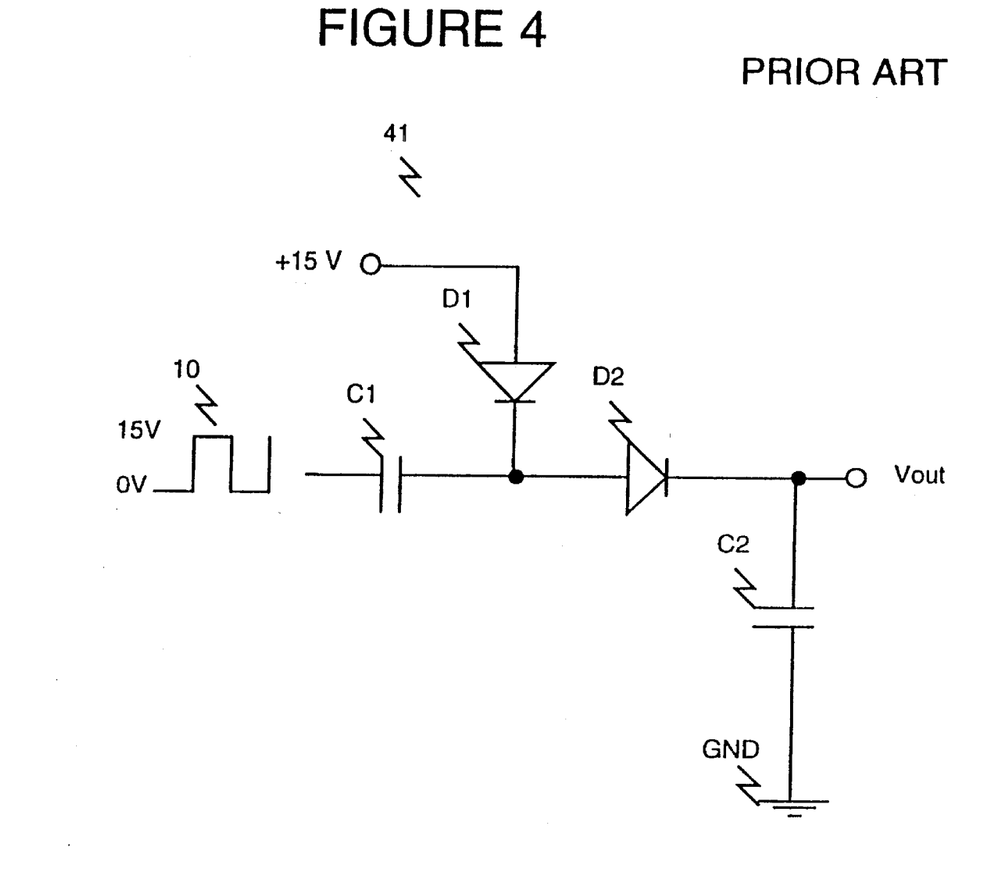
FIG. 4 is a diagram of a conventional voltage multiplying circuit using an input pulse train and a constant DC voltage source.

Given this deficiency, a conventional circuit 41 as shown in FIG. 4 was examined to determine how this problem could be solved. In FIG. 4, an input square wave pulse train 10 that oscillates between 0 and 15 volts is applied to a left plate of a capacitor C1. A constant 15 volt DC signal (+15 V) is applied to an anode of diode D1. The cathode of diode D1 is connected to a right plate of capacitor C1, which is also connected to the anode of diode D2. The cathode of diode D2 is connected to the top plate of an output capacitor C2. The bottom plate of capacitor C2 is connected to ground GND.

In the voltage converter circuit 41 of FIG. 4, when the pulse train 10 is at 15 volts, current will be pushed from the capacitor C1, through the diode D2, to thereby charge up the output capacitor C2. When the pulse train 10 drops down to 0 volts, the capacitor C1 is recharged via the constant DC source +15 V. Note that since the diode D1 is in a reverse-biased mode, the capacitor C1 cannot be recharged via the output capacitor C2.

The +15 volts applied via the +15 V DC power source adds to the +15 volts applied via the pulse train 10', and so the circuit 41 of FIG. 4 acts as a voltage multiplier, specifically a voltage doubler.

However, with the circuit 41 as given in FIG. 4, even though it provides approximately a +30 volt DC output $V_{out}$ across capacitor C2, isolation between the voltage converter 41 and external devices (e.g., an input driver providing the signal 10) is not maintained, due to the +15 V DC supply voltage being directly connected to the voltage converter 41. Placing a capacitor between the +15 V DC supply and the anode of the diode D1 will not solve this problem, since the +15 V DC supply will not transfer power through a capacitor (not shown) that is located between the +15 V DC supply and the capacitor C1 after the first time the capacitor C1 discharges through diode D1.

Figure 5:
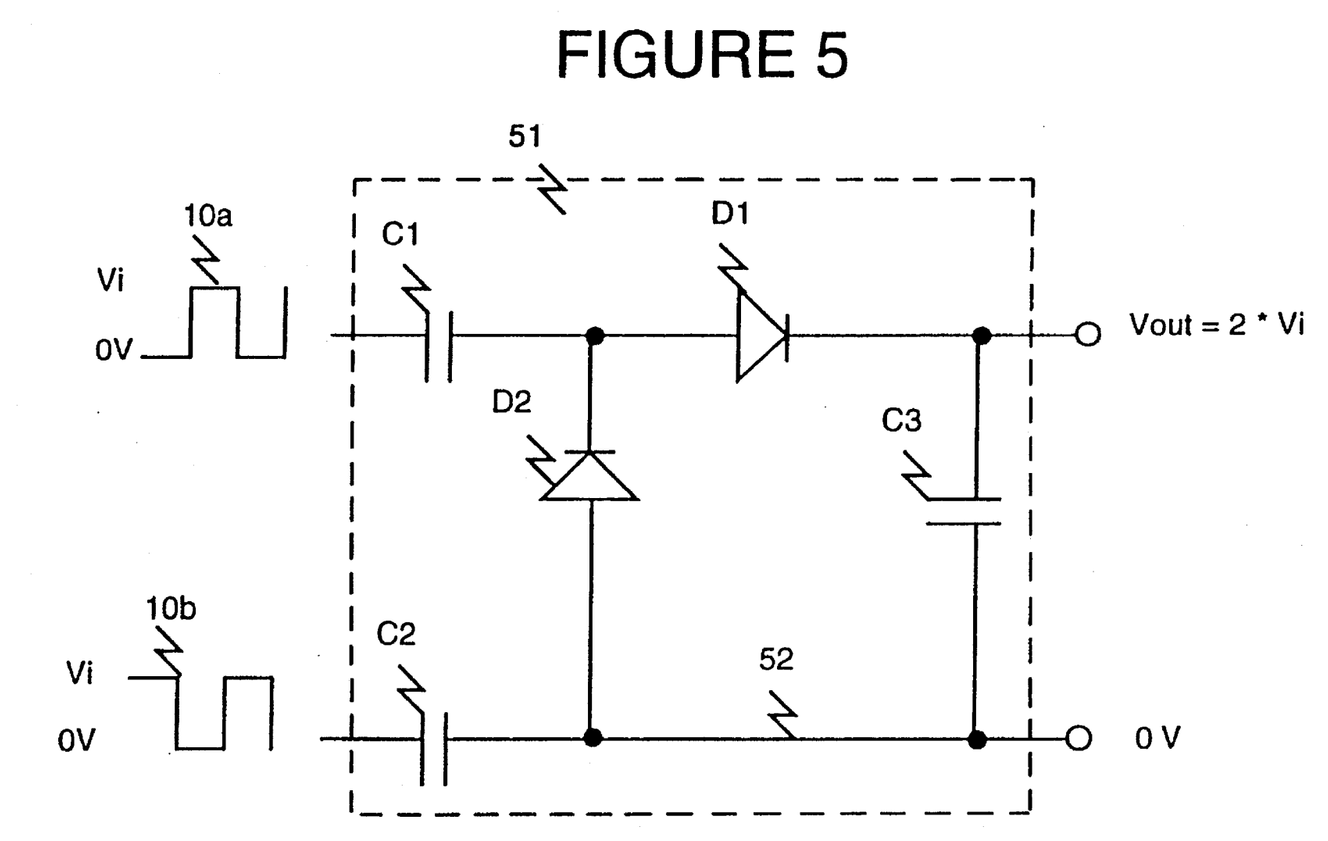
FIG. 5 is a diagram of a modification of FIG. 4, in which two out-of-phase pulse trains are utilized.

FIG. 5 shows an improvement of the circuit 41 of FIG. 4 in order to solve the isolation deficiencies of the circuit 41 of FIG. 4. In DC-DC power supply circuit 51 of FIG. 5, two out-of phase clock signals 10a, 10b are respectively connected to the left plates of capacitors C1 and C2. This effectively doubles the voltage at the output capacitor C3, while maintaining the isolation between the DC-DC power supply circuit 51 and the drivers (not shown) that provide the clock signals 10a, 10b.

In FIG. 5, the capacitor C2 is used to restore the charge on the capacitor C1 that was transferred to the output capacitor C3. The output capacitor C3 is used to recharge the capacitor C2. Thus, current is pushed from the capacitor C1, through the diode D1, and to the output capacitor C3. Also, current is pulled in to the capacitor C1 from the capacitor C2 via the diode D2.

If the isolated line on the capacitor C2 is tied to ground, that is, if it is tied back to a system ground which is also used by the driving signals 10a and 10b, then a short circuit is created to the capacitor C2 with respect to ground. Due to this short circuit condition, a tremendous amount of load on the driver (not shown) that outputs the clock signal 10b is created.

Figure 6:
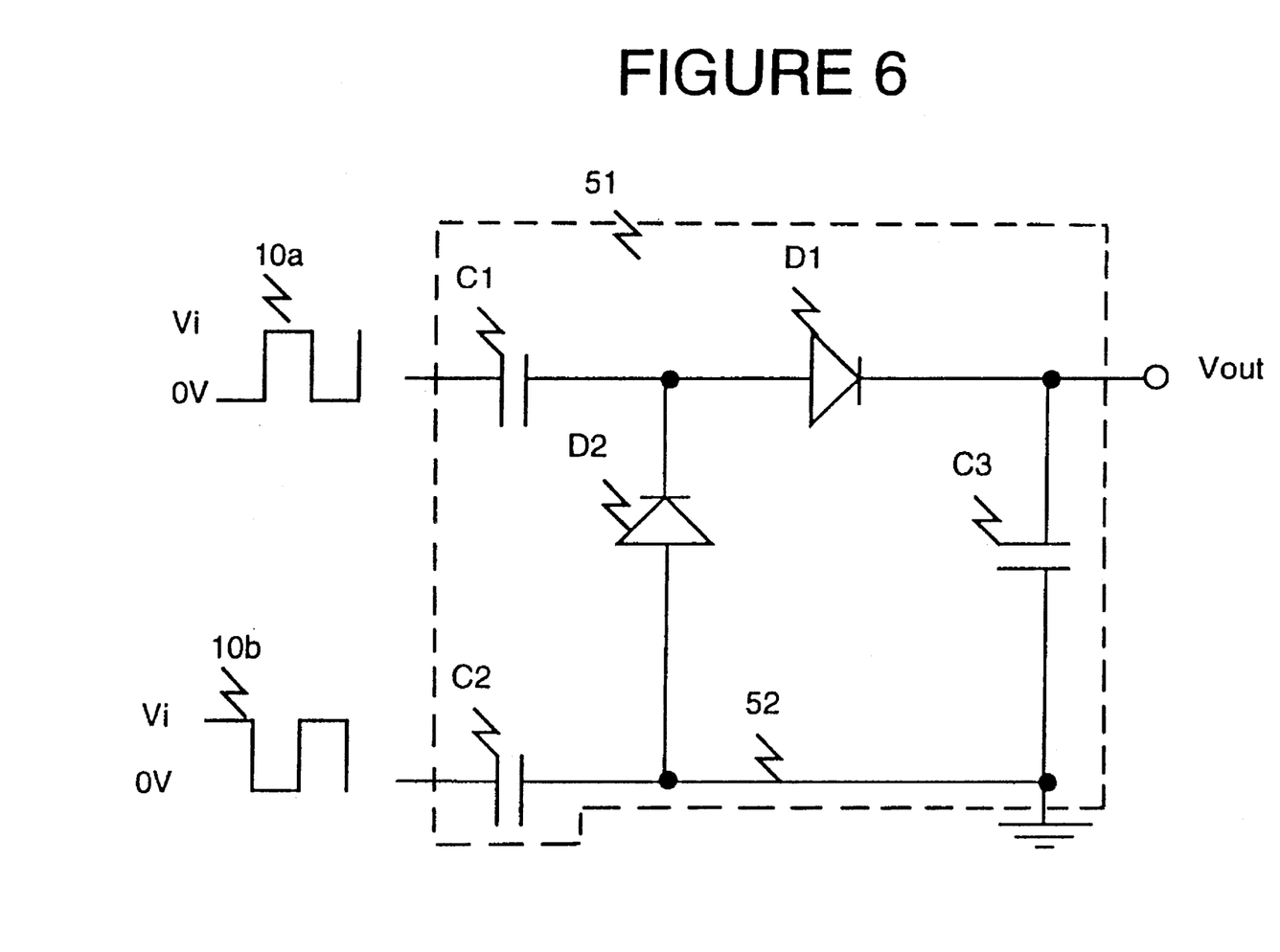
FIG. 6 is a diagram illustrating a short-circuit problem that may be associated with the circuit of FIG. 5.

Thus, the circuit 51 of FIG. 5 works fine as long as it is isolated, but if the circuit 51 is tied to system ground, then a short-circuit problem may occur. That is, during a short-circuit condition, the driver providing the second clock signal 10b in the lower leg 52 of the circuit 51 becomes overheated. This results in wasted power, and as a consequence, the circuit 51 does not provide a nearly doubled output voltage. FIG. 6 shows the connection of the lower leg 52 to a system ground GND, which effectively shorts out and overheats the lower leg input driver (not shown) that provides the second clock signal 10b.

Figure 7:
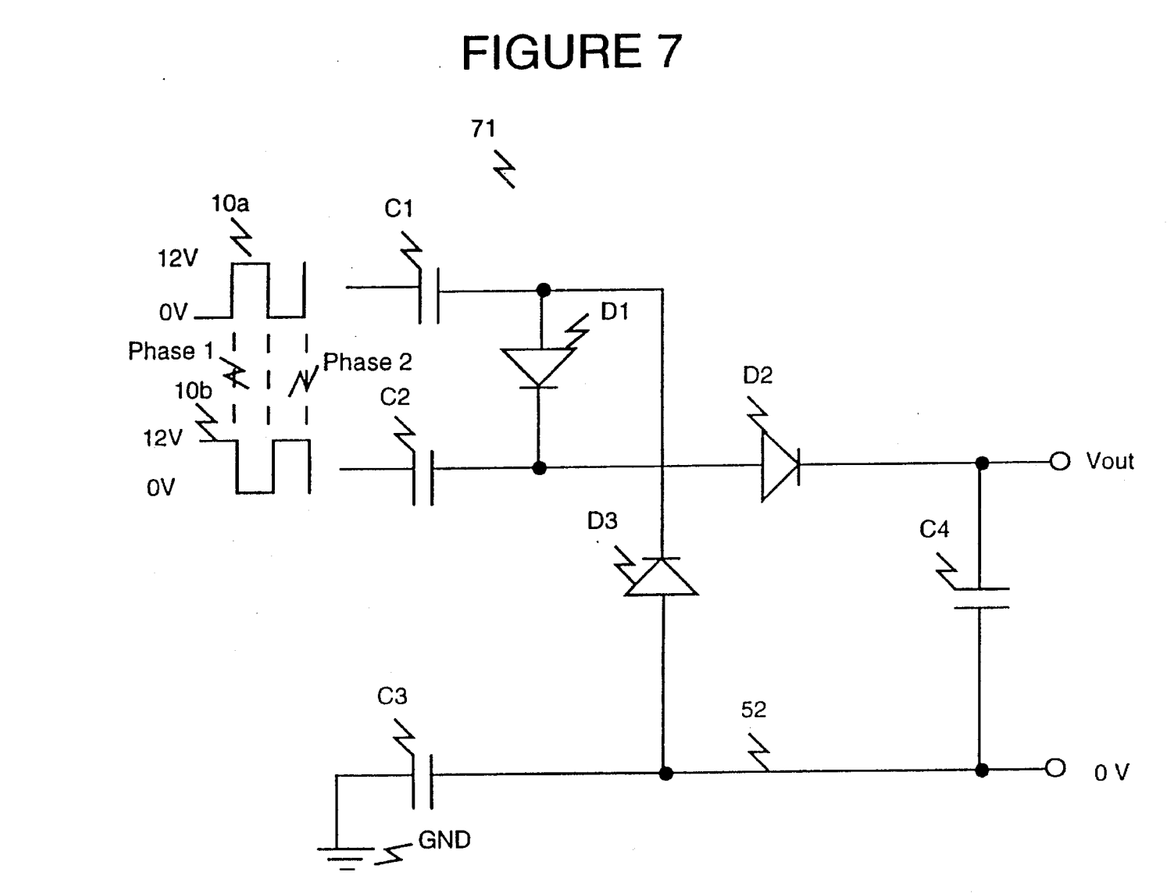
FIG. 7 is a diagram of a first embodiment of a DC-DC converter/capacitive isolated power supply according to the invention that provides voltage doubling.

To solve this problem, the circuit 71 as shown in FIG. 7 was developed, and corresponds to a first embodiment of the invention. In FIG. 7, both the first and second clock signals 10a, 10b are on the "hot" (left) side of the isolation capacitors C1 and C2. The circuit also has a third isolation capacitor C3 providing isolation from the system ground GND.

In FIG. 7, a first clock signal 10a (provided by a first driver, not shown) is connected to the left plate of capacitor C1, and the right plate of capacitor C1 is connected to an anode of diode D1. The cathode of diode D1 is connected to the right plate of capacitor C2, and the left plate of capacitor C2 is connected to a second clock signal 10b (provided by a second driver, not shown). The first and second clock signals 10a, 10b are 180 degrees out-of-phase with respect to each other, and output either a +12 volt pulse or a 0 volt pulse at any given time. When the first clock signal 10a outputs a 12 volt pulse, the second clock signal 10b outputs a 0 volt pulse. Similarly, when the first clock signal 10a outputs a 0 volt pulse, the second clock signal 10b outputs a 12 volt pulse.

The cathode of diode D1 is also connected to an anode of diode D2, and the anode of diode D1 is connected to the cathode of diode D3. The anode of diode D3 is connected to the right plate of capacitor C3, and the left plate of capacitor C3 is connected to a reference potential, such as ground GND. The cathode of diode D2 is connected to the top plate of capacitor C4, and the bottom plate of capacitor C4 is connected to the right plate of capacitor C3. A doubled voltage $V_{out}$ appears across the output capacitor C4, and is approximately equal to +24 volts. The voltage V2 is actually less than 24 volts, due to the 0.7 volt drop across diode D2 and other line losses.

Initially, assume that capacitors C1, C2, C3 and C4 have no charge stored between their respective plates, and the first and second clock signals 10a, 10b are initially both at zero volts. As a result, the right plates of each of the capacitors C1, C2 and C3 are at a ground voltage.

In the circuit 71 according to the invention, during a first phase of operation, the first clock signal 10a is at +12 volts and the second clock signal is at +0 volts. As a result of the first clock signal 10a transitioning from 0 volts to +12 volts, the left plate of capacitor C1 charges up to 12 volts. That is, a charge proportional to 12 volts is sent to capacitor C1 due to this positive voltage transition in the first clock signal 10a. This causes current to flow (i=c * dV/dt) from the right plate of capacitor C1. Since the right plate of capacitor C1 is also at 12 volts, the anode of diode D1 is also at 12 volts. The cathode of diode D1 is at ground (since it is at the same potential as the right plate of capacitor C2), and diode D1 becomes forward biased. As a result, diode D1 is effectively a short circuit (ignoring the 0.7 volt drop across D1 to simplify the explanation), and the charge proportional to +12 volts flowing from capacitor C1 is transferred to the right plate of capacitor C2.

If capacitor C4 is initially uncharged, then the charge proportional to 12 volts that is transferred from capacitor C1 to C2 during the first phase is also transferred to capacitor C4 during the first phase (since diode D2 is forward biased in this instance). During the second phase in which the first clock signal 10a is at 0 volts and the second clock signal 10b is at 12 volts, another charge proportional to 12 volts is transferred to capacitor C2. This additional charge is sent to capacitor C4 via diode D2, to thereby charge capacitor C4 up to around 24 volts.

Now, assume that capacitor C4 has been already charged up to 24 volts (or some value slightly less than 24 volts). During the next first phase of operation, diodes D2 and D3 are reverse biased, and operate as open circuits since diodes do not conduct in the reverse biased mode. That is, the anode of diode D3 is at ground, and the cathode of diode D3 is at 12 volts. Similarly, the anode of diode D2 is at 12 volts and the cathode of diode D2 is at 24 volts (since capacitor C4 has been charged up to about 24 volts previously). The anode voltage of a bipolar junction diode must be at least 0.7 volts greater than the cathode voltage of the diode in order for the diode to be conductive, which is not the case for diodes D2 and D3 during the first phase of operation (except for the initial first phase of operation when capacitor C4 is uncharged).

Between the first and second phases, the first clock signal 10a transitions from +12 volts to 0 volts, and the second clock signal 10b transitions from 0 volts to +12 volts. During the entire second phase of operation, the first clock signal 10a is at +0 volts and the second clock signal 10b is at +12 volts. The +12 volts supplied to the left plate of capacitor C2 causes current to flow to the right plate of C2. This causes the right plate of capacitor C2 to be charged up to a voltage 12 volts greater than what is was at the end of the first phase, which is 12+12=+24 volts relative to ground. Those of ordinary skill in the art will recognize that "ground" is the voltage at which the right plate of capacitor C3 is at, which need not necessary be zero volts. That is, if capacitors C1, C2 and C3 were initially charged up to 500 volts, for example, then "ground" corresponds to 500 volts, and +12 volts corresponds to 512 volts, +24 volts corresponds to 524 volts, etc.

During the second phase of operation, diode D1 is reverse biased, and diodes D2 and D3 are forward biased. Thus, diodes D2 and D3 both conduct charge during the second phase. When the first clock signal 10a applied to the left plate of capacitor C1 dropped from +12 volts to 0 volts (between the first and second phases of operation), the right plate of capacitor C1 dropped 12 volts as well (to maintain a constant voltage across capacitor C1). Since the charge proportional to 12 volts created during the first phase had been transferred from capacitor C1 during the first phase, the 12 volt drop in the first clock signal 10a results in the right plate of capacitor C1 being at −12 volts with respect to ground. This −12 volts corresponds to the anode voltage of D1 during the second phase. Since the cathode voltage of D1 is at 24 volts during the second phase, diode D1 is non-conductive.

In the circuit 71 according to the first embodiment, the capacitors C1 and C2 are essentially in series with the load (not shown) across capacitor C4. Any current from these capacitors C1 and C2 goes to driving the load. Capacitor C3 provides an AC-type isolation for these two lines, in that a reference DC ground voltage is maintained at capacitor C3 (from an AC point of view). Capacitor C3 effectively allows capacitors C1 and C2 to charge and recharge the output capacitor C4, without dissipating any of the power supplied from the drivers (not shown) that provide the clock signals 10a, 10b.

Now, assume that a load (not shown) is connected across capacitor C4, and that the load drains some of the current from capacitor C4. This causes the voltage across capacitor C4 to drop to a value below 24 volts. Since the anode of diode D2 is at 24 volts and the cathode of diode D2 is at a value less than 24 volts during the second phase, diode D2 is conductive, and capacitor C4 is charged back up to 24 volts.

Since the anode voltage of diode D3 is at 0 volts (ground) and the cathode voltage of diode D3 is at −12 volts during the second phase, diode D3 is conductive. If the voltage of capacitor C4 drops due to a load drawing current off of it, then charge will flow from capacitor C4 into capacitor C3. That charge will then flow through diode D3 to capacitor C1, thereby recharging the right plate of capacitor C1 back to "ground" voltage before the start of the next first phase of operation.

This procedure will continue for as many cycles as necessary, in which, during the first phase, a charge proportional to 12 volts is transferred from capacitor C1 to capacitor C2 through diode D1. During the second phase, another charge proportional to 12 volts is transferred to capacitor C2, and the charge proportional to 24 volts on capacitor C2 is transferred to output capacitor C4. Further, during the second phase, if a load has drawn current from capacitor C4 (thereby dropping its voltage value), then capacitor C3 will collect charge from capacitor C4 due to this voltage drop, and that charge will be pulled from capacitor C3 to capacitor C1 via diode D3.

Although the operation explained above assumed that each of the capacitors C1, C2, and C3 initially had zero volts of charge, it is also possible that each of these isolation capacitors has a large amount of charge stored therein. For example, capacitors C1, C2 and C3 initially could have 500 volts of charge stored therein. In this case, the right plate of capacitors C1, C2 and C3 will be at 500 volts, which is effectively the "ground" value for the isolated power supply. Thus, the capacitors C1, C2 and C3 provide an isolation function between the voltage converter 71 which operates at a nominal 500 volt range, and the input clock signals 10a, 10b (and other I/O devices) connected to the voltage converter 71 which operate at a much lower range (i.e., a pulse train operating at 0 and 12 volts).

With each capacitor initially charged to 500 volts, as the first clock signal 10a transitions from 0 to 12 volts at the start of the first phase, the voltage at the right plate of capacitor C1 will increase to 512 volts. A charge proportional to this 12 volt increase will be repelled from the right plate of capacitor C1 in order that capacitor C1 maintain the same electrostatic capacitance, and that repelled charge passes (as current) through diode D1 to charge the right plate of capacitor C2 to 512 volts. As a result, the voltage at the right plate of capacitor C1 is at 500 volts at the end of the first phase. Throughout the first phase, the right plate of capacitor C3 stays at a 500 volt "ground" value.

When the second clock signal 10b switches from 0 volts to 12 volts at the start of the second phase, a charge proportional to 12 volts is passed from the left plate of capacitor C2 to the right plate of capacitor C2. This makes the voltage of the right plate of capacitor C2 at 524 volts. The charge proportional to 24 volts is passed through diode D2 on to capacitor C4. As a load draws current from capacitor C4 and consequently the voltage across capacitor C4 drops below 524 volts, that voltage drop results in a charge drawn off capacitor C4 and sent to replenish capacitor C1 via diode D3 and capacitor C3.

After the initial two phases of operation, the power supply circuit 71 according to the first embodiment of the invention will attempt to stay in a steady state condition, depending upon how much current is drawn off of capacitor C4 by a load (not shown). That is, if a load is not connected to capacitor C4, then capacitor C1 will not be charged up at all during the second phase (since no charge can be drawn off of capacitor C4 due to no voltage drop of capacitor C4), and no charge will be passed from capacitor C1 to capacitor C2 during the first phase, since diode D1 will be reverse biased. Also, no charge will be passed from capacitor C2 to capacitor C4 during the second phase.

As a result, no work will be done by the circuit 71 according to the first embodiment of the invention. That, is, no work will be done with respect to any pulling or pushing of charge from one capacitor to another capacitor in the circuit 71. Thus, only when charge is being drawn off of capacitor C4 will the circuit 71 operate to transfer charge back to capacitor C4 in the procedure described above.

Now, if some amount of charge is drawn off of capacitor C4 by a load, then a charge equal to that drawn off charge will be collected by capacitor C3. That collected charge will be transferred to capacitor C1, via diode D3, during the second phase of operation. As a result, the right plate of capacitor C1 will be charged back up to ground voltage before the first phase begins again. During the subsequent first phase of operation, the charge proportional to the drawn off charge will be transferred from the right plate of capacitor C1 onto the right plate of capacitor C2. During the subsequent second phase of operation, the right plate of capacitor C2 will be increased to 24 volts with respect to "ground" due to the 12 volt increase to the left plate of capacitor C2, and so the right plate of the capacitor C2 will now be at 24 volts with respect to "ground". Thus, by this configuration, a charge proportional to the amount of charge depleted off of capacitor C4 by the load is transferred back to capacitor C4 via capacitors C1, C2 and C3.

In some respects, the circuit 71 according to the invention is like a charge coupled device (CCD), in which charge is alternately pushed from one capacitor to a next capacitor, to eventually be collected at an output capacitor. However, unlike CCDs, a feedback diode (i.e., diode D3) is also provided to allow a "repletion" function in order to recharge an initial-stage capacitor C1, as well as a capacitor isolation function.

As stated earlier, capacitors C1, C2 and C3 act as voltage isolators between the drivers (that provide the clock signals 10a, 10b) and the power supply 71. For instance, the right plates of capacitors C1, C2 and C3 could be at +500 volts, and the left plates of capacitors C1, C2 and C3 could be within 12 volts of ground. With this configuration, capacitors C1, C2 and C3 would each initially be charged up to 500 volts, or to any other voltage to provide voltage isolation between the circuit 71 and external devices connected to the circuit 71. That is, any current fluctuations on either side of the capacitors C1, C2, C3 will be isolated from the other side, and will not cause harm to the other side.

By the circuit 71 according to the first embodiment of the invention, when the voltage of the first clock signal 10a is increased from 0 volts to 12 volts, charge is added to capacitor C1, which is pushed from capacitor C1 to capacitor C2. In the second phase, the charge that was sent from capacitor C1 to capacitor C2 is replaced by capacitor C3 sending an appropriate amount of charge pulled from capacitor C3 to capacitor C1 via diode D3.

Thus, in the second phase of operation, capacitor C1 pulls current from capacitor C3 in order to keep capacitor C1 at an average voltage value.

In the circuit 71, charge is removed from capacitor C1 due to the current being pumped into capacitor C2 during the first phase. Once that charge is removed, the capacitor C1 will seek to restore that charge when the voltage on its left side is dropped from 12 volts to 0 volts during the second phase.

The circuit 71 according to the invention provides two important functions. First, capacitors C1, C2 and C3 provide voltage isolation between an input side and an output side. Second, the circuit 71 provides a voltage amplification function in a simple and inexpensive manner.

To provide a great amount of displacement current between the input and output sides, the capacitors must have an appropriate amount of capacitance. The greater the capacitance means greater sized plates, which translates to greater cost for capacitors.

However, using the circuit 71 according to the invention, the output power can be increased by increasing the rate at which the first and second clock signals 10a, 10b transition from their respective high and low states. That way, the capacitors can be charged and discharged quickly, to provide more current to a load that is utilizing the current that is provided by the circuit 71. Since power is both a function of the amount of voltage and the amount of current, by increasing the rate of recharging the output capacitor C4, the power supply 71 can increase its output power capacity by a concomitant increase in the clock rate of the input clock signals 10a, 10b. By increasing the clock rate of the input clock signals 10a, 10b, the output capacitor C4 can be replenished at a faster rate, allowing the load to draw more power from the circuit 71.

Figure 8:
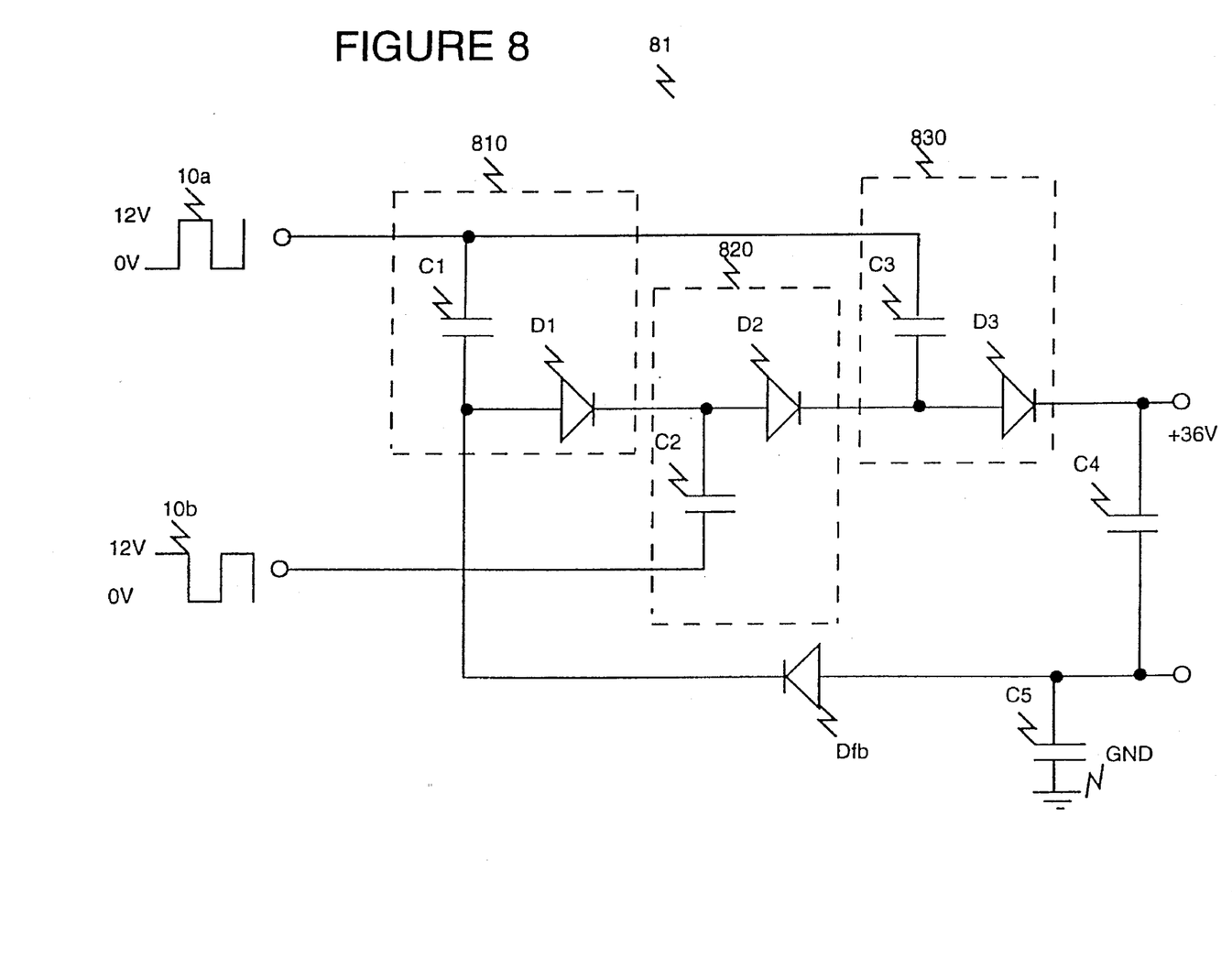
FIG. 8 is a diagram of a second embodiment of a DC-DC converter/capacitive isolated power supply according to the invention that provides voltage tripling.

FIG. 8 shows a voltage tripler circuit 81 according to a second embodiment of the invention. In FIG. 8, a first clock signal 10a is supplied to the first plates of capacitors C1 and C3, and a second clock signal 10b is supplied to the first plate of capacitor C2. During the first phase when the first clock signal 10a is at 12 volts and the second clock signal 10a is at 0 volts, capacitor C1 sends a charge proportional to 12 volts through diode D1 to the top plate of capacitor C2. The top plate of capacitor C3 is at 12 volts, but since diode D3 is non-conductive (assuming capacitor C4 is at 36 volts), charge from capacitor C3 does not flow across diode D3 to capacitor C4, and so the voltage at the bottom plate of capacitor C3 is at 12 volts.

Now, at the second phase of operation, the bottom plate of capacitor C2 is increased from 0 to 12 volts, which causes a charge proportional to 12 volts to flow to the top plate of capacitor C2. Thus, the top plate of capacitor C2 is at 24 volts, and a charge proportional to 24 volts flows from capacitor C2, across diode D2, to the bottom plate of capacitor C3. This adds to the charge on capacitor C3 during the next phase, and so capacitor C3 then has a charge proportional to 36 volts. The 36 volts at the bottom plate of capacitor C3 causes diode D3 to become conductive, and so that charge is transferred to the output capacitor C4.

Thus, the circuit 81 of FIG. 8 can be looked at as three separate capacitor/diode stages 810, 820, and 830, in which a charge is passed from a first stage 810 to a second stage 820 during the first phase, and a similar charge is passed from a third stage 830 of the output capacitor C4 during the first phase. During the second phase, the second stage 820 passes a charge to the third stage 830. Like the circuit 71 of FIG. 7, a feedback diode Dfb (similar to diode D3 of FIG. 7) is provided in order to replenish the charge a capacitor C1 in the first stage 810 as needed, based on the amount charge taken off of capacitor C4 by a load (not shown) connected in parallel to capacitor C4. Further, a reference capacitor C5 connected to a ground potential is provided in order to allow for a proper amount of charge to be applied to the capacitor C1 in the first stage 810 from output capacitor C4.

Figure 9:
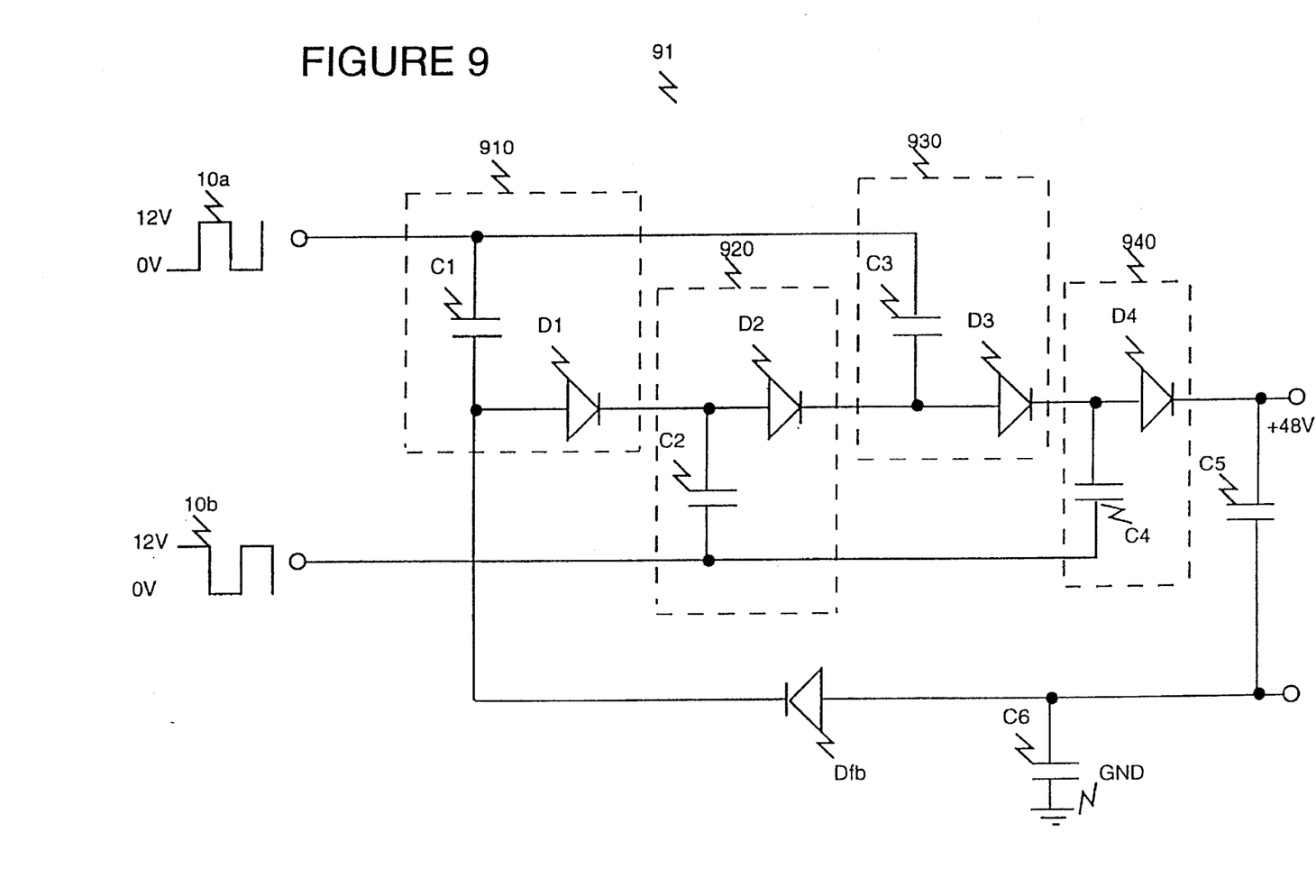
FIG. 9 is a diagram of a third embodiment of a DC-DC converter/capacitive isolated power supply according to the invention that provides voltage quadrupling.

FIG. 9 shows a voltage quadrupler circuit 91 according to a third embodiment of the invention. The circuit 91 is similar to the circuits 71, 81 of FIG. 7 and 8, respectively, but now with four separate stages 910, 920, 930 and 940 for passing charge on to a next stage, and eventually providing a "times 4" voltage multiplication function. In FIG. 9, the same amount of current flows from capacitor C1 to capacitor C2 and from capacitor C3 to capacitor C4 during the first phase, and the same amount of current flows from capacitor C2 to capacitor C3 and from capacitor C3 to capacitor C4 during the second phase. Thus, the voltage quadrupler circuit 91 of FIG. 9 provides a constant output current to output capacitor C5 at all times. Adding stages in the circuit 91 does not reduce the output current capacity.

Although only a voltage doubler circuit 71 (FIG. 7), a voltage tripler circuit 81 (FIG. 8) and a voltage quadrupler circuit 91 (FIG. 9) are shown and described herein, those of ordinary skill in the art will recognize that a "times-n" voltage converter can easily be utilized in the system according to the invention by using n stages, with each stage having a capacitor and a diode, and having a feedback diode from the output capacitor back to the capacitor in the first stage. Of course, the respective signals from the first and second input drivers are input to alternating stages, as shown in FIGS. 7, 8 and 9.

By any of the circuits 71, 81, 91 of the system according to the invention, the output current is constant regardless of the number of stages added, while power goes up with output voltage.

Thus, both voltage conversion and capacitive isolation are provided in a simple and economical manner by the system according to the invention.

While preferred embodiments have been described herein, modifications of the described embodiments may become apparent to those of ordinary skill in the art, without departing from the scope of the invention as set forth in the appended claims.

For example, while the preferred embodiment described above uses diodes and capacitors, other equivalent devices can be used to provide either a charge storing function (capacitor equivalents) or a charge transferring function (diode equivalents).

Figure 10:
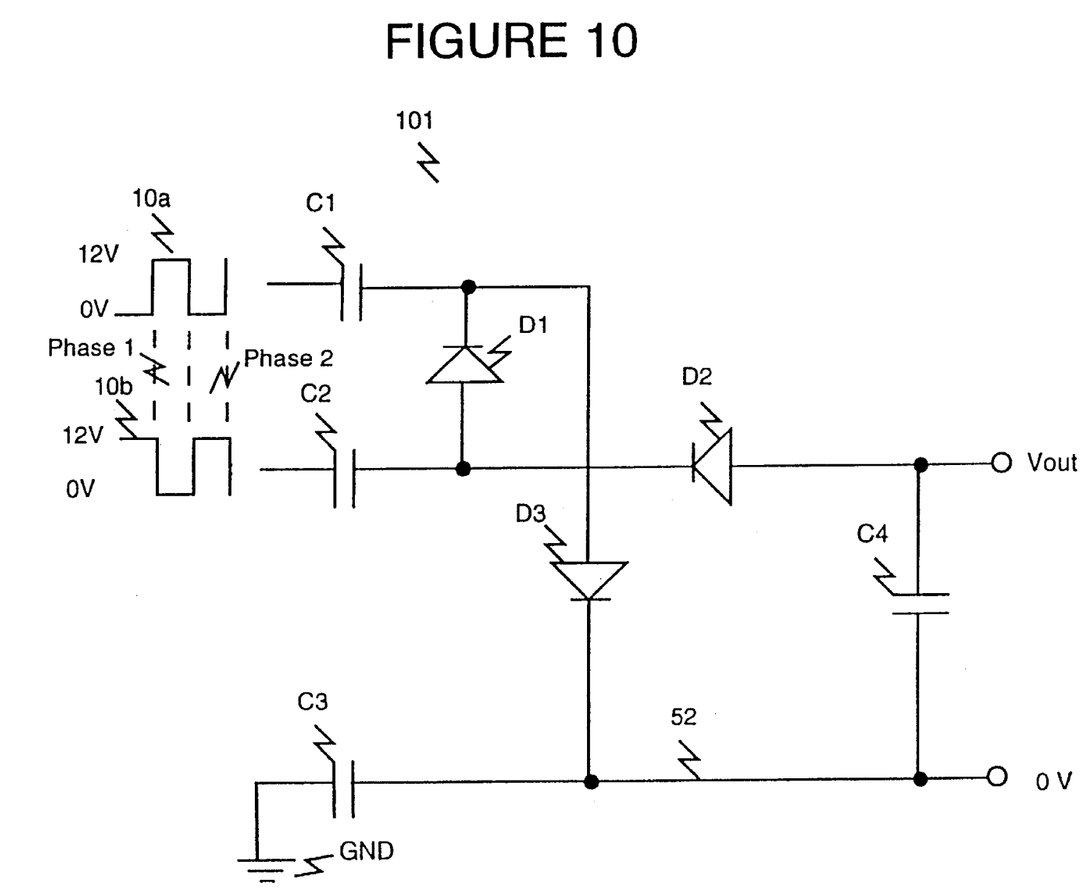
FIG. 10 is a diagram of a fourth embodiment of a DC-DC converter/capacitive isolated power supply according the invention that provides negative voltage doubling.

Further, those of ordinary skill in the art will recognize that an isolated power supply for providing negative voltages may be obtained using the topology described above. Referring now to the circuit 101 as shown in FIG. 10, in which each of the diodes D1, D2 and D3 have been reversed in position with respect to the circuit 71 of FIG. 7, a negative doubled voltage will be obtained (i.e., a voltage of about −24 volts). In the circuit 101 of FIG. 10, the current flows in the opposite direction as the circuit 71 of FIG. 7, but in all other respects the circuits 71, 101 operate the same.

What is claimed is:

1. A voltage multiplier circuit for providing charge to a load and configured to receive a first and a second clock signal, said first and second clock signals being out of phase with respect to each other, and each having one of a first and a second voltage value, comprising:

a first stage coupled to receive the first clock signal and to store a first charge corresponding to a voltage difference between the first and second voltage values when the first clock signal is at the first voltage value, and to output the first charge when the first clock signal is at the second voltage value;

a second stage coupled to receive the second clock signal and coupled to the first stage for receiving the first charge, said second stage being configured to store a second charge corresponding to two times a voltage difference between the first and second voltage values when the first clock signal is at the first voltage value, and to output the second charge when the second clock signal is at the second voltage value;

an output capacitor coupled to receive the second charge from the second stage; and a feedback diode coupled to the output capacitor, a reference potential and the first stage, wherein when the first clock signal is at the second voltage value, a feedback charge proportional to an amount of charge drawn off the output capacitor by the load is sent to recharge the first stage via the feedback diode.

2. A voltage multiplier circuit according to claim 1, further comprising:

a reference capacitor coupled to the reference potential;

wherein the reference capacitor provides isolation for the voltage multiplier circuit.

3. A voltage multiplier circuit according to claim 1, wherein said first stage comprises:

a first capacitor having a first plate coupled to receive the first clock signal and having a second plate; and a first diode coupled to the second plate of the first capacitor and coupled to the second stage.

4. A voltage multiplier circuit according to claim 3, wherein said second stage comprises:

a second capacitor having a first plate coupled to receive the second clock signal and having a second plate; and a second diode coupled to the second plate of the second capacitor and coupled to the output capacitor.

5. A voltage multiplier circuit according to claim 4, wherein said first and second capacitors provide isolation between said voltage multiplier circuit and said first and second clock signals.

6. A voltage multiplier circuit according to claim 5, wherein said first and second capacitors are initially charged to a voltage level of the load.

7. A voltage multiplier circuit for providing charge to a load and configured to receive a first and a second clock signal, said first and second clock signals being out of phase with respect to each other, and each having one of a first and a second voltage value, comprising:

an input stage coupled to receive the first clock signal and to store a first charge corresponding to a voltage difference between the first and second voltage values when the first clock signal is at the first voltage value, and to output the first charge when the first clock signal is at the first voltage value;

multiplying means, connected to the input stage, for providing an integer multiple of the first charge;

an output stage coupled to receive one of the first and second clock signals and coupled to receive the integer multiple of the first charge from the multiplying means, the output stage being configured to store a second charge corresponding to the integer multiple of the first charge plus the first charge;

a reference capacitor coupled to a reference potential;

an output capacitor coupled to receive the second charge from the output stage; and a feedback diode coupled to the output capacitor, the reference capacitor and the first stage, wherein when the first clock signal is at the second voltage value, a feedback charge proportional to an amount of charge drawn off the output capacitor by the load is sent to recharge the first stage via the feedback diode.

8. A voltage multiplier circuit according to claim 7, wherein the input stage comprises:

a first capacitor configured to store the first charge; and a first diode configured to output the first charge when the first clock signal is at the first voltage value.

9. A voltage multiplier circuit according to claim 8, wherein said output stage comprises:

a second capacitor configured to store the second charge; and a second diode configured to output the second charge to the output capacitor.

10. A method for providing capacitive isolation and voltage multiplication for a device having a first stage, a second stage and an output stage, comprising the steps of:

a) providing a charge proportional to a first voltage to the first stage during a first time frame;

b) moving the charge from the first stage to the second stage during the first time frame;

c) providing a charge proportional to the first voltage to the second stage during a second time frame, the second stage being charged to a value corresponding to two times the first voltage;

d) moving the charge from the second stage to the output stage during the second time frame; and e) recharging the first stage from the output stage during a next occurrence of the first time frame.

\* \* \* \* \*